United States Patent [19]
Colineau et al.

[11] Patent Number: 5,838,743
[45] Date of Patent: Nov. 17, 1998

[54] SYSTEM FOR SERIAL RECEPTION OR READING OF INFORMATION

[75] Inventors: Joseph Colineau, Bures S/Yvetter; Michel Audoin, Villeneuve St Georges, both of France

[73] Assignee: Thomson-CSF, Paris, France

[21] Appl. No.: 495,583

[22] PCT Filed: Dec. 8, 1994

[86] PCT No.: PCT/FR94/01433

§ 371 Date: Aug. 9, 1995

§ 102(e) Date: Aug. 9, 1995

[87] PCT Pub. No.: WO95/16317

PCT Pub. Date: Jun. 15, 1995

[30] Foreign Application Priority Data

Dec. 10, 1993 [FR] France .................................. 93 14869

[51] Int. Cl.$^6$ ....................................................... H04L 7/02
[52] U.S. Cl. .......................................... 375/354; 375/371
[58] Field of Search .................................... 375/346, 350, 375/354–355, 371, 373

[56] References Cited

U.S. PATENT DOCUMENTS

| | | | |
|---|---|---|---|
| 4,030,045 | 6/1977 | Clark | 331/1 A |
| 4,607,230 | 8/1986 | Kaku et al. | 375/376 |
| 4,807,257 | 2/1989 | Schouhamer Immink et al. | 375/354 |
| 4,908,842 | 3/1990 | Collins | 375/373 |

FOREIGN PATENT DOCUMENTS 0 173 569 A3  3/1986  European Pat. Off. .
0 241 974 A1  10/1987  European Pat. Off. .

*Primary Examiner*—Young T. Tse
*Attorney, Agent, or Firm*—Oblon, Spivak, McClelland, Maier & Neustadt, P.C.

[57] ABSTRACT

This system for receiving or reading digital serial information provides for the information to be sampled at regular intervals under the control of a local clock. It includes a table containing for each pair of values of consecutive information samples a measured phase value.

1 Claim, 5 Drawing Sheets

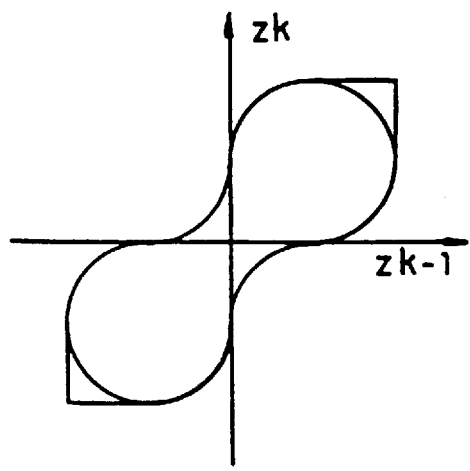
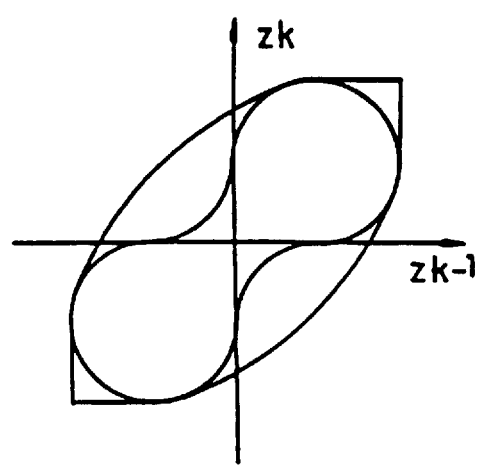
FIG.4  FIG.5
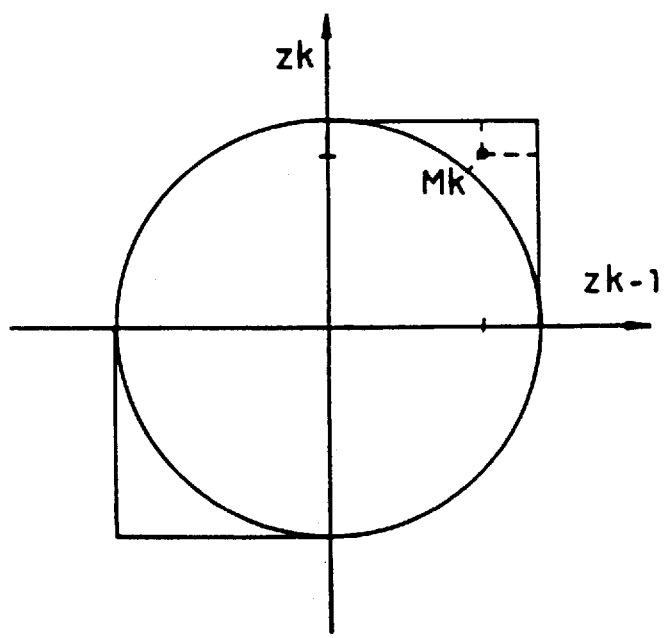
FIG.6

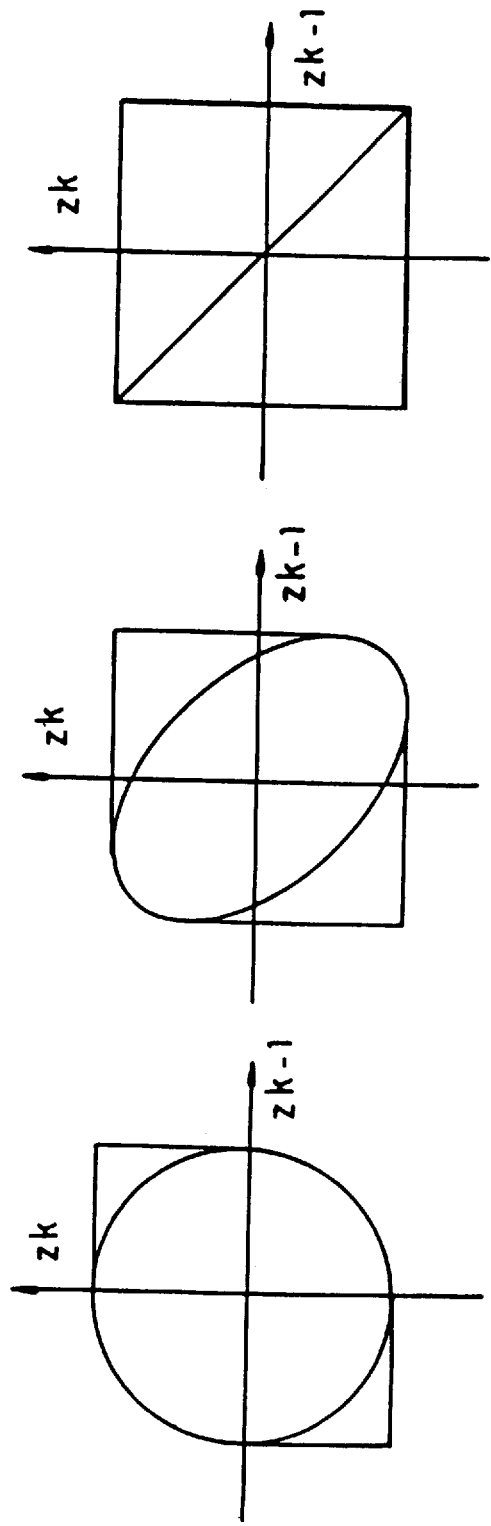

SYSTEM FOR SERIAL RECEPTION OR READING OF INFORMATION

BACKGROUND OF THE INVENTION

Field of the Invention

The invention relates to a system for serial reception or reading of information, and especially a system for receiving or reading digital information, in which the local clock is not slaved to the send clock (or write clock) and in which it is required to determine the phase of the signal with respect to the local clock.

The receiving portion of a pathway for transmitting or storing digital information generally includes a function of regenerating the clock for the transmitted information. In most cases this clock is reconstructed from the actual string of data transmitted. The present invention applies to the reconstruction of the clock of a received signal sampled asynchronously with respect to this clock.

A phase tracking filter embodied digitally includes a phase (or phase deviation) measurement function and a prediction (or estimation) function.

When the analog signal is sampled on the basis of the reconstructed clock, as is generally the case in digital pathways, the phase deviation is close to zero once the phase loop is locked. It is obvious how to determine the phase error if the signal is oversampled by a factor of two. Algorithms (Mueller and Müller) have been proposed in the case of a binary signal sampled at bit frequency.

In the case where the sampling frequency is arbitrary with respect to the bit frequency, the instantaneous phase varies rapidly and it is not obvious how to determine this phase with good accuracy.

SUMMARY OF THE INVENTION

The circuit which is the subject of the invention makes it possible to determine the phase of each of the samples of a two-level or multilevel digital signal transmitted through an analog channel.

The invention therefore relates to a system for receiving or reading digital serial information, in which the information is sampled at regular intervals under the control of a local clock, characterized in that it includes at least one table containing for each pair of values of consecutive information samples a measured phase value.

BRIEF DESCRIPTION OF THE DRAWINGS

The various subjects and characteristics of the invention will emerge more clearly in the description which will follow given by way of example and in the appended figures which represent:

FIGS. 4 and 5, other loci of sample pairs;

FIG. 6, a diagram explaining the determination of the likely position of a sample pair;

FIGS. 12a–12c, representations of loci of the sample pair at different frequencies.

DISCUSSION OF THE PREFERRED EMBODIMENTS

The system of the invention will firstly be described in a simple and then a generalized case.

Figure 1:
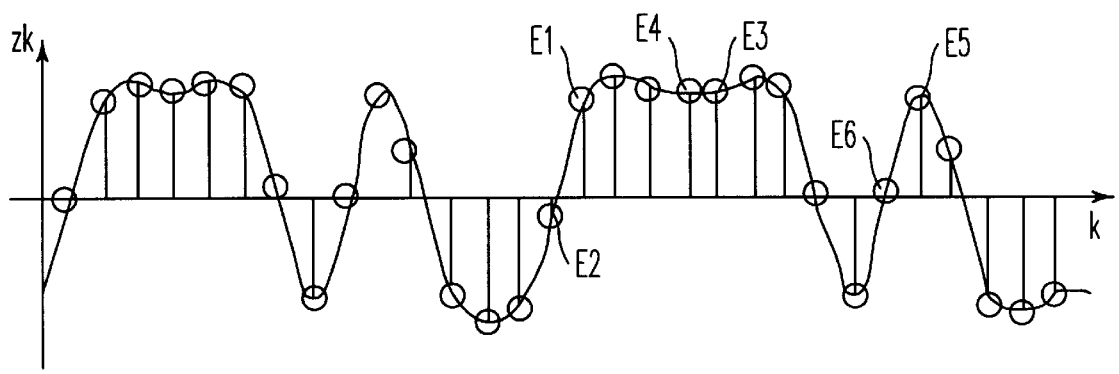
FIG. 1, an example of a received signal.

FIG. 1 represents a binary signal transmitted through a Nyquist channel and sampled at a frequency $f_e = 2 f_b$ ($f_b$=bit frequency or binary frequency of the signal received).

Figure 2:
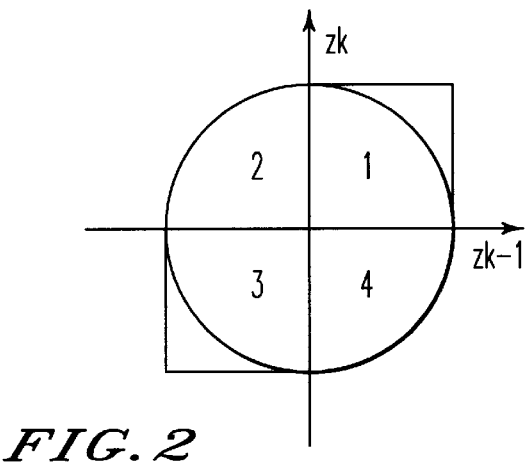
FIG. 2, a representation of the loci of sample pairs.

The geometrical representation of the locus of the successive sample pairs ($z_{k-1}$, $z_k$) with a nominal amplitude and in the absence of noise is given in FIG. 2. The various trajectories can be graduated in phase. It can be seen that when the point representing the signal lies in one of quadrants 2 or 4 of the ($z_{k-1}$, $z_k$) plane, it is possible to determine unambiguously the phase of the signal at this instant. For example, samples E1 and E2 of FIG. 1 give rise to a point in quadrant 2.

In the absence of noise, other regions of the possible trajectories are usable. On the other hand, when the representative point lies close to the point (1, 1) or the point (−1, −1), it is not possible to give a value of the phase of the signal.

In quadrants 1 and 3, the right-hand portions correspond to sample pairs such as E3–E4, situated on straight parts of the curve. The circular portions correspond to sample pairs such as E5–E6 of like sign.

Quadrants 2 and 4 are those for which the signal changes sign between 2 successive samples. This is the situation generally used to make a measurement of phase in the phase comparators of analog phase-locked loops (PLL) and in most embodiments of digital PLLs. It will be seen that it is possible to make a measurement of phase in other cases. These other situations are not generally used since it is necessary to take account of the lesser accuracy of the measurement over certain portions of the trajectory, or of the risk of error of assignment of the current point to its true trajectory. Thus, if it is considered that in the real case, the signal is affected by noise, and by an amplitude error, there is a probability of error in the measurement which depends on the relative proximity of the point to the closest trajectories.

The solution of the invention consists in precalculating for each point of the ($z_{k-1}$, $z_k$) plane, the most probable value of the phase of the signal, namely that of the closest point on one of the nominal trajectories of the signal, as well as a degree of confidence accorded to this value depending on the distance from this trajectory and from the other closest trajectories. This fairly cumbersome calculation is done only once and the results are stored in a memory table. The results of these calculations are found at the address given by a pair of points ($z_{k-1}$, $z_k$) and the circuit can exploit them in real time.

Figure 3A:
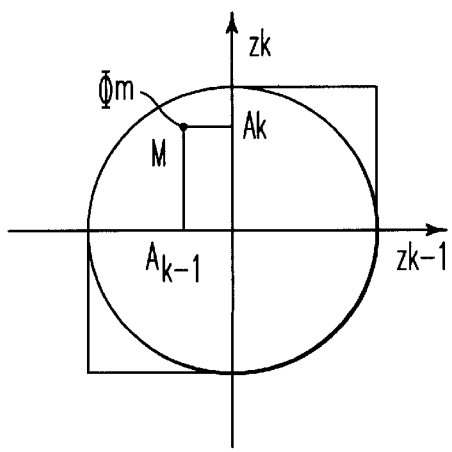
FIGS. 3a and 3b, an example of the principle of the phase measurement.
Figure 3B:
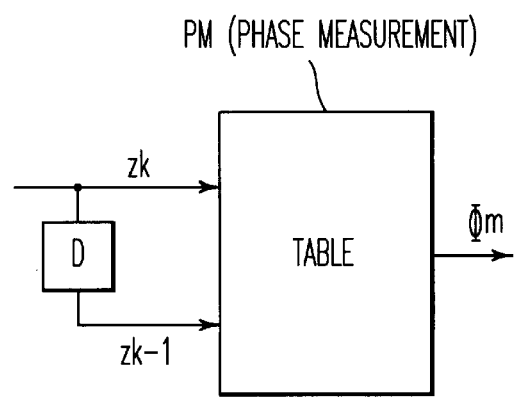

Thus the circuit of FIG. 3b receives two samples $z_k$ and $z_{k-1}$. A delay circuit D enables these two samples to be provided at the same time to the illustrated phase measurement (PM). The pair of amplitudes $A_{k-1}$ and $A_k$ corresponding to these samples (FIG. 3a) then allows access to a phase value in the PM table.

In the case where the signal is two-level (as in FIG. 1) and equalized according to a Nyquist channel of order zero ($\cos^2$ equalization), the shape of the loci of sample pairs is very simple, and a law of calculation for the phase of the signal can easily be deduced, namely:

$$\Theta_m(k) = 2 \operatorname{Arc} Tg \left| \frac{\sin \Pi Fb/Fe}{\cos \Pi Fb/Fe - \frac{Zk-1}{Zk}} \right|$$

FIGS. 4 and 5 give the trajectories of the signals for other conventional pathways. The analytical expressions are more difficult to determine, but it is still possible to calculate them by considering, one after the other, the configurations of corresponding transmitted binary signals and by calculating, from the impulse response of the channel, the signals received.

FIG. 6 shows the position of a point measured at a given instant. This point does not lie precisely on a trajectory of the signal owing to the presence of noise in the channel. If the phase is not stabilized, then only the proximity of the point M to each trajectory can be used as a basis. The most likely trajectory will be picked in order to determine the phase.

The likelihood of the hypothesis Tj is the conditional probability of obtaining a measurement for M if the trajectory is Tj. It is expressed by:

$$pr(M|Tj) = \left( \frac{1}{2\pi N_0 b} \right) \exp\left( -\frac{MN^2}{2N_0 b} \right)$$

where $N_0 b$ is the variance of each measurement $z_k$.

The probability of observing M is then the product of the probability of obtaining the trajectory Tj and that of observing M if the trajectory is Tj:

pr(M)=pr(M|Tj) .pr(Tj)

It is therefore possible, for a given point, to pick the most probable hypothesis and also, by comparing the probability of this hypothesis and that of the other possible hypotheses, to accord a greater or lesser score to this measurement. The non-gaussian fluctuations in the channel (variations in the amplitude of the signal etc.) can also be taken into account in this step.

The probable value of the phase of the signal and a confidence coefficient $C_k$ are calculated in this way for each point of the plane.

When the phase filter is stabilized, it is possible, furthermore, to take account of the predicted value of the phase, and of the uncertainty in this prediction. By making the approximation of a gaussian phase error, the above calculations can be generalized by defining, for example, a conditional probability of observing M if the trajectory is Tj and if the phase is the predicted value $\Phi_k$.

It is also possible to use the predicted value of the phase to eliminate certain improbable trajectories, or even to determine the most probable trajectory.

Figure 7:
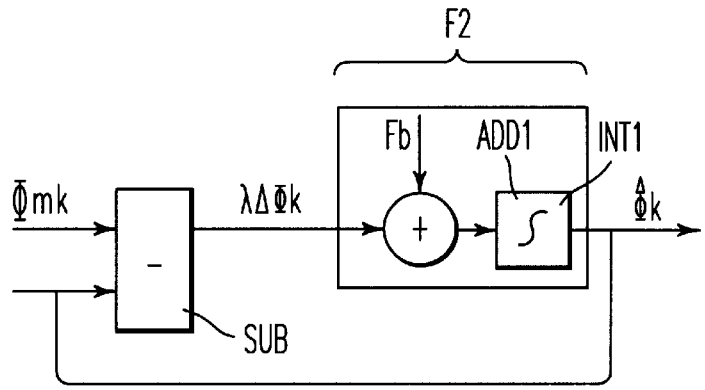
FIG. 7, a simplified filter of the phase shift measurement.

FIG. 7 represents a phase filter structure. Phase prediction proper is performed by integrating a constant representing the frequency $F_b$ of the signal. A phase error is obtained by differencing the predicted phase and the measured phase with the aid of a subtractor SUB. The phase error is weighted by a coefficient λ. This weighted error is added (adder ADD) to $2\pi Fb/Fe$ and then integrated (integrator INT1).

Figure 8:
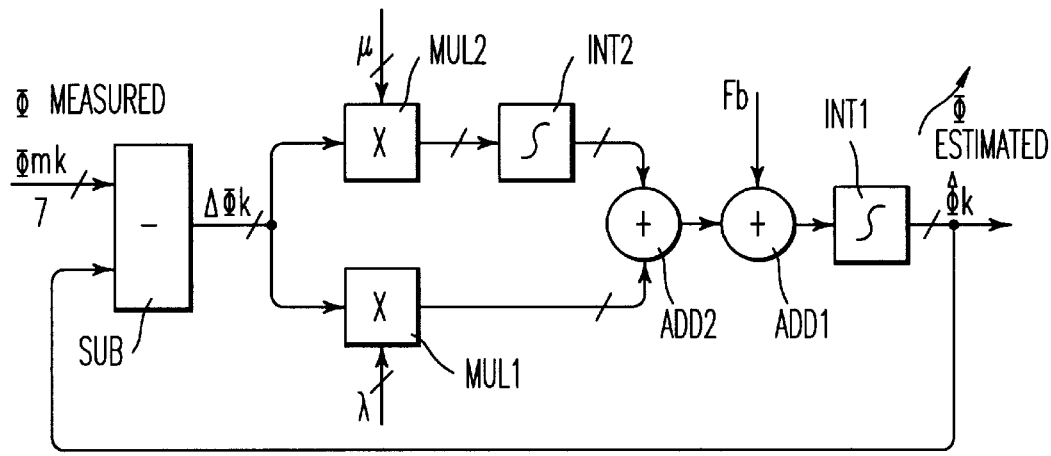
FIG. 8, a more complete filter of the phase shift measurement.

FIG. 8 represents an example of a more complete embodiment of this filter. The subtractor SUB, the multiplication circuit MUL1 which weights with the aid of a coefficient λ, the adder ADD1 and the integrator INT1 carry out the functions of the filter of FIG. 7. Furthermore, the output of the subtractor SUB is connected up to a multiplier MUL2 (multiplication coefficient μ) and to an integrator INT2 in such a way as to estimate a mean deviation in frequency by integrating the instantaneous phase error which will be fed in after weighting by the coefficient μ.

Calculation of the likelihood of a measurement assumes that the amplitude of the signal is known and stable. In the general case, small fluctuations, or a deviation in level may occur. It is easy to correct them if these phenomena are of low frequency compared with that of the signal. Knowing zk, zk-1 and possibly Φk makes it possible to determine the amplitude of the signal, or the amplitude deviation with respect to the nominal value. This deviation can be weighted as was done for the phase deviation.

Figure 9:
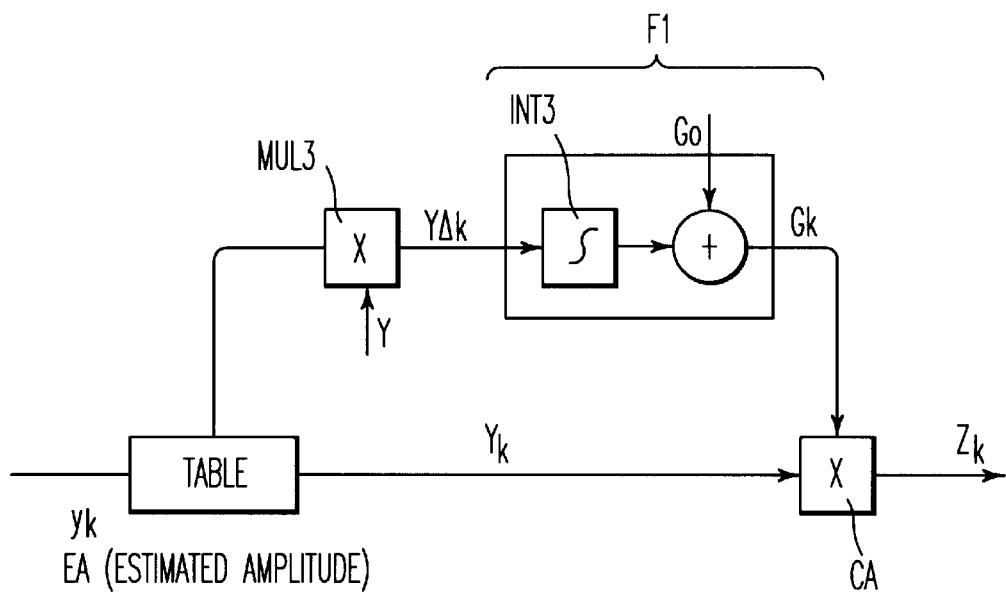
FIG. 9, an amplitude monitoring filter.

This measurement makes it possible after filtering and addition with a set value, to correct the amplitude of the signal (FIG. 9).

Figure 10:
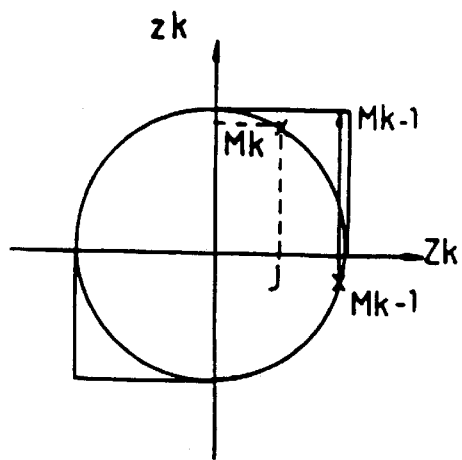
FIGS. 10 and 11, a general system of phase shift measurement.

The taking into account of the last sample(s) transmitted in the channel and which is (are) already decoded makes it possible to retain only the trajectories compatible with the value of a sample being received, thus reducing the risks of confusion or indeterminacy. By default, an estimate of this information based on the preceding sample can be used. For example FIG. 10 represents the position of a current point Mk: there is a possible ambiguity between two trajectories (the circular trajectory over the straight trajectory). If the possible positions of the point $M_{k-1}$ at the preceding instant are represented, it will be seen that it easy to remove the ambiguity, even if a very small number of bits are used to describe zk-2. It is not generally possible to move indiscriminately from one trajectory to another (circular to straight for example) or to travel in either direction along a trajectory. Rather than zk-2, it may be beneficial to use the knowledge of the trajectory at the preceding instant, and for this purpose to deliver at each instant an information item giving the current trajectory.

In certain cases, it is by knowing, even approximately, the next sample that it is possible to remove the ambiguity in the trajectory.

It is advantageous to use the same phase measurement table to incorporate the calculation of the weighted phase deviation. Instead of delivering a phase $\Phi_{mk}$ and a confidence coefficient $C_k$, the table can deliver directly a phase difference $\lambda\Delta\Phi_k$ weighted by the confidence coefficient $C_K$, thus reducing the number of numerical operators and outputs. The filter of FIG. 7 can therefore be used effectively. The filter of FIG. 7 is also simplified, being a first-order filter.

A phase-locked loop (PLL) including all of the provisions described above is represented in FIG. 11. This structure is of high performance and well suited to the processing of a complex signal such as for example the signal from a partial response channel PR2, the phase diagram of which is represented in FIG. 4. In general, it will be possible to retain only some of the provisions made without excessive degradation in performance.

Figure 11:
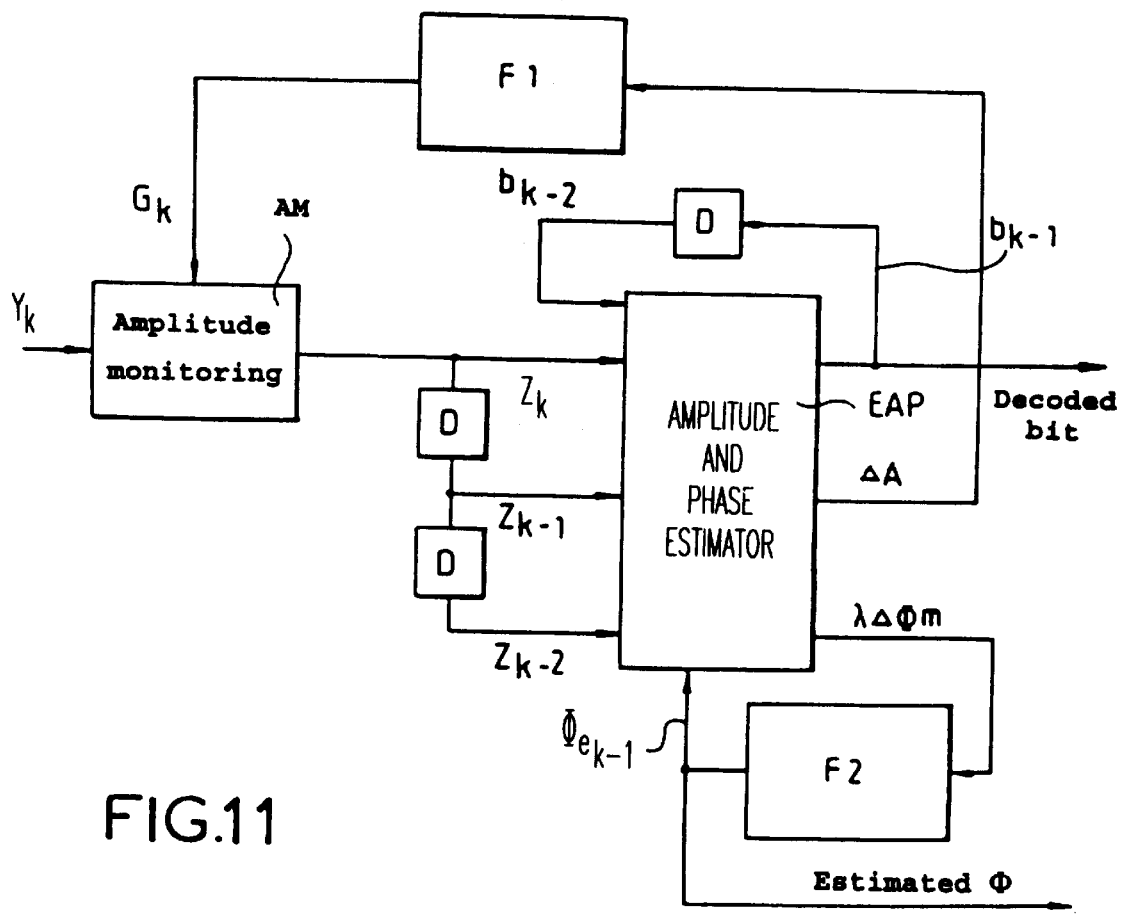

The system of FIG. 11 includes an amplitude monitoring circuit AM receiving the various successive samples yk. This amplitude monitoring circuit (amplifier for example) weights the amplitude of each sample with the aid of a coefficient $G_k$.

Each amplitude-corrected sample $Z_k$ is transmitted to an estimated amplitude and phase table EAP as well as to delay circuits D. The latter transmit the preceding samples $Z_{k-1}$ and $Z_{k-2}$ to the table EAP. In the box of the table EAP corresponding to the samples the system finds a phase error $\lambda\Delta\Phi_m$ to which a confidence coefficient has been assigned. This signal is transmitted to a filter F2 of the type shown in FIG. 7. The filter F2 provides the estimated phase of the local clock.

Furthermore, each sample pair ($Z_k$, $Z_{k-1}$) enables the system to obtain from the table an amplitude deviation ΔA. The latter is transmitted to an amplitude monitoring filter F1 of the type shown in FIG. 9. This filter F1 controls the amplitude monitoring circuit AM.

It was seen earlier that a priori knowledge—even imprecise—of the phase through a knowledge of the preceding decodings makes it possible to remove ambiguities between several possible trajectories. It is therefore possible in this case to use the estimated information which is provided to the input of the table so as better to separate the possible hypotheses.

Another means of removing the ambiguity is to use the decoded signal $b_{k-2}$ or the sample $Z_{k-2}$.

FIG. 12a represents a diagram of the loci of the sample pairs for a sampling frequency equal to twice the bit frequency. FIG. 12c represents a diagram for a sampling frequency equal to the bit frequency.

In the case where the sampling frequency is not an integer multiple of the bit frequency, the above diagrams are modified but it is still possible to apply this method. It turns out to be more accurate than the classical method of linear interpolation applied to the transitions of the signal. For example FIG. 12b shows the diagram corresponding to a sampling frequency Fe=3/2 Fb.

Some decoding algorithms do not demand prior equalization of the signal. In general it is not simple to define and apply an analytical law for calculating the phase under these conditions. On the other hand, it is always possible to define the diagram experimentally, if need be.

Making the phase measurement with ROM memory allows, without requiring any extra component, the combining of other useful functions within a decoding chain: detection of significant drops in level ("erasures"), detection and management of the desynchronizing of the phase-locked filter, the limit on the number of "cost-free" extra functions being fixed by the number of outputs available in the ROM memory.

In particular, the signal decoding function can be easily integrated into the table. Thus, with the help of the Lagrange interpolation formulae, and by knowing (at least) 3 successive samples $Z_{k-2}$, $Z_{k-1}$, Zk and the phase $\Phi_{k-1}$, it is possible to reconstruct a sample i k-1 such that:

$$i(k-1) = \sum_{i=0}^{2} C_i z(k-i) \; avec \; C_i = \prod_{j=0; jl \neq i}^{2} \frac{(\Pi - \phi_{k-1}) - tj}{ti - tj} \; et \; t_k - t_{k-1} = Te$$

In order to decode the signal it suffices to retain the sign of ik (threshold decoding):

b(k-1)=sgn (i k-1)

FIG. 11 presents an embodiment of this function.

As seen in the foregoing description, the system of the invention enables the phase measurement law to be described by a table whose inputs are the values of several (generally 2) successive signal samples and the predicted value of the current phase. In certain cases, it will also be possible to take into account the value of the last bit or bits decoded, or the sign of the preceding sample. In each of its boxes, corresponding to one of the possible combinations of the input quantities, the table contains a measurement of the phase as well as a degree of confidence accorded to this measurement. In a preferred variant, these two items of information are replaced by a value of the phase error weighted by the degree of confidence. Likewise, the table also delivers a value of the amplitude of the signal as well as a degree of confidence in this measurement or a weighted value of the amplitude deviation with respect to a reference level.

The information thus delivered is used to operate a phase prediction filter which gives an estimate of the phase of each sample of the signal. An amplitude monitoring loop completes the device in the case of the transmission of a multilevel digital signal.

The structure of the system of the invention is applicable to the recovery of the clock of two-level or multilevel signals in the general case of an asynchronous processing pathway. Measurement of the phase is carried out by maximum likelihood, allowing optimal performance even in the "difficult" cases of low signal-to-noise ratio, or where the sampling frequency is not an integer multiple of the bit frequency. The embodiment which would be complex if hard-wired or programmed numerical operators were used, is here much simplified through the use of table techniques. Another advantageous embodiment could use neural network techniques to replace the table in ROM memory.

What is claimed is:

1. A system for receiving or reading a digital serial information signal, comprising:

a sampling portion in which the information signal is sampled at regular intervals under control of a local clock to provide a succession of information samples;

an amplitude monitoring circuit configured to receive the succession of information samples from the sampling portion and a weighting factor to provide a succession of amplitude corrected information samples:

a system element connected to receive the succession of amplitude corrected information samples, said system element including a table, said table including precalculated probable phase values, wherein each one of the precalculated probable phase values is related to two consecutive information samples of the succession of information samples, and estimated values of amplitude deviation with respect to a nominal value; and wherein said system element is configured to provide a precalculated probable phase value at an output portion as a measured phase value and an amplitude deviation value as an input to an amplitude monitoring filter configured to convert the amplitude deviation value to the weighting factor and to supply the weighting factor to the amplitude monitoring circuit.

* * * * *